(12) United States Patent
Ramezani

(10) Patent No.: US 10,131,502 B2
(45) Date of Patent: Nov. 20, 2018

(54) FRONT AND/OR SIDE MOUNT MOTOR

(71) Applicant: Kamran Ramezani, La Jolla, CA (US)

(72) Inventor: Kamran Ramezani, La Jolla, CA (US)

( * ) Notice: Subject to any disclaimer, the term of this patent is extended or adjusted under 35 U.S.C. 154(b) by 0 days.

(21) Appl. No.: 15/475,553

(22) Filed: Mar. 31, 2017

(65) Prior Publication Data
US 2017/0283177 A1    Oct. 5, 2017

Related U.S. Application Data

(60) Provisional application No. 62/317,624, filed on Apr. 3, 2016.

(51) Int. Cl.
*B65G 13/11* (2006.01)
*B65G 23/22* (2006.01)
*B65G 13/06* (2006.01)
*B65G 21/20* (2006.01)
*B65G 13/07* (2006.01)

(52) U.S. Cl.
CPC .......... *B65G 23/22* (2013.01); *B65G 13/07* (2013.01)

(58) Field of Classification Search
CPC ........ B65G 13/06; B65G 13/07; B65G 13/11; B65G 21/20; B65G 23/22
USPC .............................. 198/780, 788, 860.1, 866
See application file for complete search history.

(56) References Cited

U.S. PATENT DOCUMENTS

| | | | |
|---|---|---|---|
| 3,918,574 A | 11/1975 | Allison | |
| 5,912,541 A | 6/1999 | Bigler et al. | |
| 6,206,181 B1 | 3/2001 | Syverson | |
| 6,420,846 B1 | 7/2002 | Wolfe | |
| 6,902,446 B1 | 6/2005 | Healey | |
| 7,102,318 B2 | 9/2006 | Miura et al. | |
| 7,166,981 B2 | 1/2007 | Kakutani et al. | |
| 7,175,018 B2 * | 2/2007 | Helgerson | B65G 13/06 198/780 |
| 7,537,107 B2 | 5/2009 | Hall | |
| 7,671,551 B2 | 3/2010 | Bi et al. | |
| 8,307,976 B2 * | 11/2012 | Kratz | B65G 39/02 198/788 |
| 8,757,363 B2 | 6/2014 | Combs et al. | |
| 9,004,263 B2 | 4/2015 | Hall et al. | |
| 9,573,769 B2 * | 2/2017 | Specht | B65G 43/10 |

(Continued)

FOREIGN PATENT DOCUMENTS

| | | |
|---|---|---|
| EP | 1086522 A1 | 3/2001 |
| EP | 2664563 A1 | 11/2013 |
| WO | 99/65134 A1 | 12/1999 |

OTHER PUBLICATIONS

Potentially related U.S. Appl. No. 15/459,649, filed Mar. 15, 2017.

*Primary Examiner* — Douglas A Hess
(74) *Attorney, Agent, or Firm* — The Dobrusin Law Firm, PC

(57) ABSTRACT

A conveyor system comprising: (a) one or more frames; (b) one or more controllers; (c) one or more motors located within a motor housing; and (d) a plurality or rollers; wherein the motor housing includes one or more internal pockets that receive the motor and the one or more controllers, and the controller is in contact with one or more walls of the motor housing; and wherein the motor housing is directly connected to the frame so that at least one of the one or more walls in contact with the controller are in direct contact with the one or more frames.

20 Claims, 6 Drawing Sheets

(56) References Cited

U.S. PATENT DOCUMENTS

2003/0089580 A1   5/2003   Pfeiffer
2013/0134017 A1   5/2013   Hall et al.

* cited by examiner

FRONT AND/OR SIDE MOUNT MOTOR

FIELD

The present teachings generally relate to a motor housing and/or controller housing including a controller and a motor and the controller is connected to a frame of a system by a front mount or a side mount.

BACKGROUND

Conveyor systems are used through industry for many reasons such as loading or unloading a truck, moving articles within a machine or factory, or moving articles to a secondary packing location. Conveyor systems typically include a plurality of rollers so that as an article such as a box is placed on the conveyor system the article can be moved without lifting the article as the article moves between two locations. Some conveyor systems only include free rolling rollers that allow an article to move using gravity, a push from a user, or another article pushing a first article down the conveyor. Some conveyor systems are motorized so that one or more of the rollers rotate to move an article along the conveyor system. These conveyor systems generally include a motor within one or more of the rollers or a motor that is suspended from the conveyor frame that rotates one or more of the rollers. The one or more rotated rollers may be coupled to other rollers so that multiple rollers are driven by a motor. These motors are typically connected to a controller, which is located at a location separate from the motor. However, attempts have been made to connect a controller to a motor, but keep the controller separate from the motor so that heat from the motor is not transferred to the controller. Generally, during operation controllers and especially power switching devices have a shorter life span than an associated motor, thus, the controller fails before the motor, requiring the controller to be replaced. The controller heating up or being heated by the motor may contribute to a shorter life span of the controller.

Examples of conveyor systems may be found in U.S. Pat. Nos. 6,206,181; and 7,537,107; 8,757,363; and 9,004,263 all of which are incorporated by reference herein for all purposes. It would be attractive to have a controller that is located within a motor housing. What is needed is a controller that connects directly to the frame and supports a motor. It would be attractive to have a controller and motor that are connected together and are suspended from a frame. What is needed is a controller that is in contact with a wall of a motor housing, a controller housing, or both and the wall of the motor housing, the controller housing, or both are in contact with a frame of the conveyor system. It would be attractive to have power switching devices that are cooled by the frame as a heat sink.

SUMMARY

The present teachings meet one or more of the present needs by providing: a conveyor system comprising: (a) one or more frames; (b) one or more controllers; (c) one or more motors located within a motor housing; and (d) a plurality or rollers; wherein the motor housing includes one or more internal pockets that receive the motor and the one or more controllers, and the controller is in contact with one or more walls of the motor housing; and wherein the motor housing is directly connected to the frame so that at least one of the one or more walls in contact with the controller are in direct contact with the one or more frames.

The present teachings meet one or more of the present needs by providing: a conveyor system comprising: (a) one or more frames; (b) one or more controllers located within a controller housing; (c) one or more motors located within a motor housing; (d) a plurality or rollers; wherein the motor housing includes one or more internal pockets that receive the motor and the controller housing includes one or more internal pockets that receive the one or more controllers, and the controller is in contact with one or more walls of the controller housing; and wherein the controller housing is directly connected to the frame so that at least one of the one or more walls in contact with the controller are in direct contact with the one or more frames and the motor housing is connected to the controller housing.

The present teachings provide: a motor comprising: (a) a motor housing including: (i) a first pocket including one or more motors; (b) a second pocket including one or more controllers directly connected to one or more walls of the second pocket; wherein: (1) the first pocket and the second pocket are both located within the motor housing; (2) the first pocket is located within the motor housing and the second pocket is located within a controller housing that is connected to the motor housing and the motor housing and the controller housing are formed in one integral piece; or (3) the first pocket is located within the motor housing and the second pocket is located within a controller housing that is connected to the motor housing, and the controller housing is separable from the motor housing.

The present teachings provide a controller that is located within a motor housing. The present teachings provide a controller that connects directly to the frame and supports a motor. The present teachings provide a controller and motor that are connected together and are suspended from a frame. The present teachings provide a controller that is in contact with a wall of a motor housing, a controller housing, or both and the wall of the motor housing, the controller housing, or both are in contact with a frame of the conveyor system. The present teachings provide power switching devices that are cooled by the frame as a heat sink.

DETAILED DESCRIPTION

Figure 1:
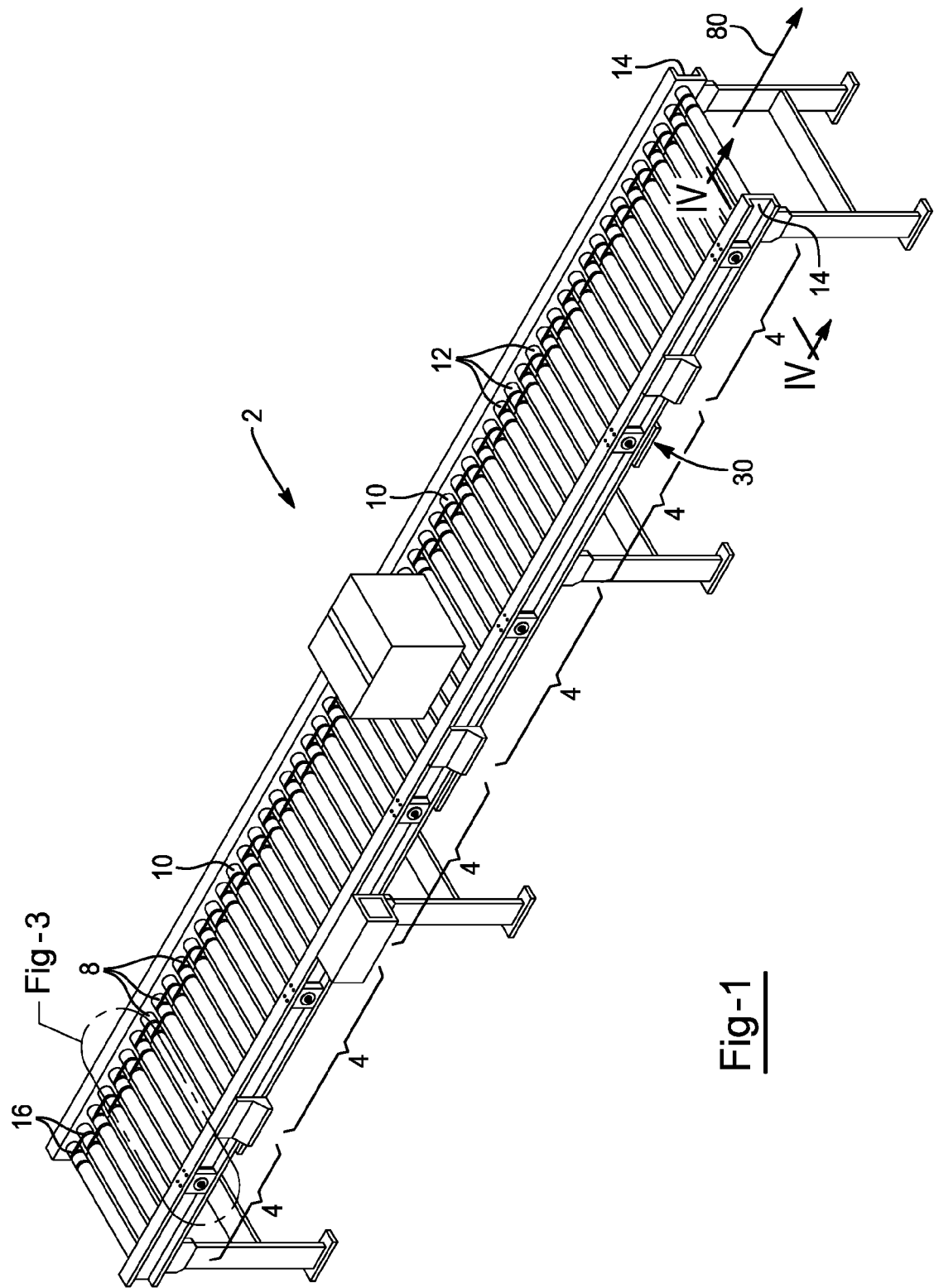
FIG. 1 is a perspective view of a conveyor system that is a roller conveyor.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teaching relate to a motor and controller that are directly connected to a machine that includes a frame. The frame of the machine is located proximate to one or more controllers that act as a heat sink for the controller components, the motor, or both. Preferably, a controller is connected to a wall of the controller housing and the wall of the controller housing is directly connected to the frame so that heat transfers through the wall directly to the frame removing heat from the controller and controller housing. The machine may be any machine that has a motor and controller directly connected there two for moving one more components of the machine. The machine may be any machine that includes a frame that supports the motor and controller. The machine may be a conveyor system.

The conveyor system functions to move articles between two locations. The conveyor system may move items out of a truck, into a truck, within a factory or warehouse, from machine to machine, or a combination thereof. The conveyor system may have one or more interconnected rollers that are driven by a single motor. Preferably, the conveyor system may include a plurality of rollers that are connected together by one or more transfer devices. The conveyor system may be a roller conveyor, a belt conveyor, or a combination of both. The conveyor system may include one or more roller conveyors.

The one or more roller conveyors may function to directly contact an article so that the article moves along the rollers. The one or more roller conveyors may include one or more master rollers and one or more slave rollers. Preferably, each of the roller conveyors include one master roller and a plurality of slave rollers. The roller conveyors may be one section within a conveyor section. The roller conveyors may be connected by a transfer device that covers a portion of each roller and transfers force, torque, or both from one roller to another roller. The one or more roller conveyors may include one or more transfer devices that are located at a single end of the rollers. The roller conveyors may have exposed rollers versus a belt conveyor that includes a transfer device that substantially covers the rollers.

The one or more belt conveyors may function to move an article along the conveyor system by supporting the article on a transfer device (e.g., conveyor belt) that is supported by the rollers. The one or more belt conveyors may include a single transfer device in each zone that moves articles. The one or more belt conveyors may include one or more master rollers that drive each transfer device. The one or more belt conveyors may carry an article along the transfer device and the transfer device may be supported by one or more rollers (e.g., slave rollers), one or more support devices (e.g., a low friction support), or both that are located under the transfer device. The one or more belt conveyors the one or more roller conveyors, or both may include one or more zones.

The one or more zones may operate independently of one another. Each of the zones may include one or more master rollers. Each zone may include a plurality of slave rollers. Each zone may be driven by one or more master rollers that provide power, torque, or both to a plurality of slave rollers via one or more transfer devices. The zones may each be operated at different speeds. The zones may communicate with one another via one or more controllers.

One or more controllers may be located within each zone, in connection with a motor, in connection with a master roller, or a combination thereof and each of the one or more controllers may communicate with one another. The one or more controllers may operate each zone. The one or more controllers may control the motor of each zone. Each motor may have a standalone controller. The one or more controllers may communicate from one zone to another zone. The plurality of controllers may be a master controller and one or more slave controllers. The master controller may provide instructions to a plurality of slave controllers. The master controller may be located proximate to one or more motors. The master controller may be located separate from the motor. The slave controllers may be located proximate to the motors. The master roller may be located at a central location and in communication with the slave controllers. The master controller and slave controllers may be in communication via a wire, wirelessly, or a combination of both. The plurality of controllers may be in communication via Wi-Fi, Bluetooth, or both. The controllers may be in communication with a detection device to control the motor. The detection device may be a laser, sensor, photocell, a motor position sensor, or a combination thereof that detects a sustained presence of an object on the conveyor and stops the motor while the detection device detects the presence of an objection. The controller may include a printed circuit board. The printed circuit board may include one or more power switching devices. The one or more power switching devices may be a metal-oxide semiconductor field-effect transistor (MOSFET); transistor; insulated gate bipolar transistor (IGBT); rectifier; triode for alternating current (TRIAC); bipolar junction transistor (BJT); or a combination thereof. The one or more power switching devices may produce heat during use. The one or more power switching devices may be connected to the printed circuit board and may be directly or indirectly in contact with the controller housing, the motor housing, or both. The one or more power switching devices may be in communication with the frame via a wall of the controller housing, the motor housing, or both. The frame may function as a heat sink for the power switching devices. The one or more power switching devices may directly contact a wall. The one or more power switching devices may be in contact with a wall via a thermal grease, a thermal adhesive, or both. The printed circuit board may include one or more capacitors, one or more resistors, one or more diodes; one or more inductor; one or more microprocessors; one or more switches, one or more thermistors, or a combination thereof. The printed circuit board may be connected to the motor housing, controller housing, a wall, or a combination thereof via one or more fasteners. The printed circuit board may be free of direct contact with the motor housing, controller housing, a wall, or a combination thereof. The printed circuitry may include surface mounted circuitry. The printed circuit board may be directly mounted to or in contact with motor housing, controller housing, a wall, or a combination thereof. An entire area of the printed circuit board may be in contact with motor housing, controller housing, a wall, or a combination thereof. The printed circuit board may contact a motor housing, controller housing, a wall, or a combination thereof through the one or more power switching devices. The controllers may include memory, a processor, a motor controller, a position sensor, a network interface, terminal block, power source, wired power source, capacitor, zone selector, or a combination thereof. Some of the one or more controllers may be located separate from the motor. Preferably, the one or more controllers may be located within the motor housing, or a controller housing connected to or part of the motor housing. The controller may be in direct contact with a wall of the motor housing, the controller housing, or both. The controller or a printed circuit board of the controller may be attached to a wall of the motor housing or controller housing that is in contact to the frame. The frame, the controller housing, the motor housing, or a combination thereof may act as a heat sink for the controller, the printed circuit board, the power switching devices, or a combination thereof. Preferably, the frame may be a heat sink for the power switching devices. The power switching devices may be thermally in contact with the frame through the controller housing, the motor housing, or both. A thermal adhesive or thermal grease may be located between the wall and the controller to promote heat transfer to the wall. A thermal grease or thermal adhesive may be located between the frame and the motor housing, the controller housing, or both to promote thermal transfer to the frame. The motor housing, the controller housing, or both may be made of aluminum and may readily transfer heat to the frame through the wall. A wall may separate the controller and the frame. The controller may be located within the motor housing, the controller housing, or both so that heat from the motor extends around the controller and to the frame. The controller may be located so that heat from the motor passes around the controller to the frame. The controller may extend parallel to the wall and be substantially entirely in contact with the wall. The one or more controllers may be located external of the motor housing, and connected to the motor housing, or not connected to the motor housing. The one or more controllers may be located within an integrated assembly (e.g., a controller housing). The integrated assembly or controller housing may be directly or indirectly connected to the motor housing, the frame, or both. Each controller may control one motor but may be in communication with another motor so that each zone is coordinated with the adjacent zones (e.g., zones up stream, downstream, or both of a zone of interest). Each controller may function to control a plurality of rollers. Preferably, each controller may control a motor that is associated with one or more master roller, and the one or more master roller may provide power to one or more slave rollers.

Each zone includes a plurality of rollers. Each of the plurality of rollers spans between two sides of a frame and support articles as the articles are moved along the rollers. Each zone may include one or more cantilever rollers. Preferably, when a cantilever roller is present the cantilever roller is a master roller. The plurality of rollers include one or more master rollers and one or more slave rollers and the master rollers drive one or more of the slave rollers.

The one or more master rollers function to be rotated by a motor, move an article, move one or more slave rollers, or a combination thereof. The one or more master rollers may be directly connected to a motor. The one or more master rollers may be indirectly connected to a motor (e.g., by a transfer device). Preferably, one motor rotates one master roller. The conveyor system may include a plurality of motors that are each connected to a single master roller. The one or more master rollers may be located in a plane (e.g., a second plane) above or below the motor, the slave rollers, or both. The one or more master rollers may be located within the same plane as the motor, the slave rollers, or both. The one or more master rollers may be a partial roller (e.g., a pulley) when the master rollers are located between the slave rollers. The pulley may not directly support articles. Preferably, when the motor and the master roller are located between the slave rollers the master roller is a pulley that is connected to one or more slave rollers by a torque transfer device. The one or more master rollers and the one or more slave rollers may all be located in line. The one or more master rollers may directly contact an article moving across the conveyor system. For example, an article may move from the master roller to a slave roller, or may contact the master roller and one or more slave rollers at the same time. The one or more master rollers may be free of any intervening devices between the motor shaft and the roller shaft. The master roller may include a solid roller shaft that extends from a first end of the master roller to a second end of the master roller. The master roller may contact a first side of the frame and a second side of the frame to support the master roller within the conveyor system. The master roller may extend cantilever form the frame. The motor shaft may be located at a first end and a second end and may be terminal so that the motor shaft does not extend through a body of the roller. The one or more master rollers may include a roller shaft that extends into the motor shaft or vice versa. The one or more master rollers may be free of any belts extending between the motor and the master roller. The one or more master rollers may be free of any couplings located between the master roller and the motor. The one or more master rollers may be located at an end of the conveyor system, in a middle of the conveyor system, or both. The one or more master rollers may be located between one or more slave rollers. The one or more master rollers may include a plurality of slave rollers on each side (e.g., upstream and downstream). The one or more master rollers may be substantially the same size as the slave rollers. The master rollers may be larger than the slave rollers. The one or more master rollers may be smaller than the one or more slave rollers. The one or more master rollers may be connected to one or more slave rollers via one or more transfer devices. The one or more master rollers may directly drive each slave roller via one or more transfer devices. The one or more master rollers may directly drive some slave rollers and indirectly drive some slave rollers vie one or more transfer devices. For example, some slave rollers may drive other slave rollers by transfer devices extending between two or more slave rollers.

The one or more slave rollers may function to support one or more articles, one or more transfer devices, or both. The one or more slave rollers may assist in moving one or more articles. The one or more slave rollers may surround the master rollers. The one or more slave rollers may be substantially identical to the master rollers. The one or more slave rollers may extend parallel to the master rollers. Each slave roller is suspended between two pieces of the frame (e.g., a first frame piece and a second frame piece that are parallel to each other). Each zone may include at least one master roller and a plurality of slave rollers. The slave rollers may be connected to the frame at one or both ends. The one or more slave rollers, master rollers, or both may be a support device.

The one or more support devices may function to support a transfer device. Preferably, the support device may support a conveyor belt. The one or more support devices may act as a bearing surface but may be free of rotation. The support devices may have a low friction surface and may act as a roller (e.g., a support) or may be a roller. For example, the support devices may be located under the transfer device and when the transfer device contacted the supports of the support device, the supports may create a low friction contact similar to that of a roller. The one or more support devices may have a smooth surface. The support devices may be made of or include a polymer, metal, polytetrafluoroethylene, urethane, nylon, phenolic plastic, adetal, delrin, polyethylene, polyimide, polysulfone, polyphenylene sulfide, or a combination thereof.

The one or more frames function to support the plurality of rollers or the supports so that articles can move along the conveyor system. The frame may be one or more pieces that support one or more ends of the rollers, a motor, a controller, or a combination thereof. The one or more frames may be "L" shaped, "C" shaped, "U" shaped, "I shaped," or a combination thereof. Preferably, the one or more frames may be two parallel pieces. The one or more frames may connect two or more zones together or extend between two or more zones. The one or more frames may be connected to one or more bearings that support one or more ends of the rollers. The one or more frames may be directly connected to the one or more rollers and the roller shafts may be static relative to the frame and a roller housing may be movable relative to the roller shaft. The one or more motors may be directly connected to the frame. One or more motors may be directly connected to the frame and the one or more motors may support and an end of the roller relative to the frame. The motors may hang from the frame (e.g., a top of the motor housing or controller housing may connect to a bottom of the frame). Preferably, the controller housing is connected to the frame and the motor housing is located below the controller housing so that both the controller housing and the motor housing hang from the frame. A face of the one or more motor housings or the one or more controller housings may be connected to the frame. The one or more frames may be made of metal and may support the rollers and articles that move along the frame. The frame may support the rollers so that the rollers rotate as the motor and transfer devices provide power between the plurality of rollers.

The transfer devices may function to provide power from a master roller to one or more slave rollers, from a slave roller to one or more adjacent slave rollers, or both. The one or more transfer devices may connect a motor, a master roller, or both to one or more slave rollers. Preferably, the transfer devices only connects rollers to rollers. For example, the transfer devices may connect a master roller to a slave roller or the transfer device may connect two or more slave rollers together. The transfer devices may be made of or include metal, rubber, fiber, a reinforcement, a natural material, a synthetic material, plastic, a polymer, poly vinyl chloride, urethane, neoprene, nylon, nitrile, polyester, leather, or a combination thereof. The transfer derives may be a chain, a reinforcement coated by rubber, a gear, a toothed member, a belt, or a combination thereof. The transfer device may be one or more flexible couplings.

The one or more flexible couplings may function to connect two or more rollers together in a roller conveyor. The flexible couplings may extend over a roller in an end region of the roller. The one or more flexible couplings may sit within a recess in the rollers. The one or more flexible couplings may be located at one end or both ends in an end region. The one or more flexible couplings may be a single piece. The one or more flexible couplings may be a plurality of things connected together. The one or more flexible couplings may be a chain with a plurality of links. The one or more flexible couplings may be a polymer or rubber that is an endless piece. The flexible couplings may be a gear that extends from one roller to an adjacent roller to provide power form one roller to another roller. The flexible couplings may be used with a conveyor belt, but preferably when a conveyor belt is used the flexible couplings are not used.

The one or more transfer devices may be a conveyor belt. The one or more conveyor belts function to carry an article above a plurality of rollers. The one or more conveyor belts may be supported on the one or more rollers. The conveyor belts may be driven by one or more master rollers. The conveyor belt may be driven by friction between the conveyor belt and the master roller. The conveyor belts may receive the plurality or rollers so that the plurality of rollers are substantially covered by the conveyor belt. The conveyor belt may extend between two sides of the frame. The conveyor belt may be driven by a master roller. The conveyor belt may be one solid piece that is connected together forming an endless conveyor belt. The conveyor belt may be made of rubber, poly vinyl chloride, urethane, neoprene, nylon, nitrile, polyester, leather or a combination thereof. The conveyor belt may extend over a body of the rollers.

The body of the rollers may be a main part of the roller that carries a load of an article. The body of the roller may be located between the roller shafts. The body of the roller may be hollow. The body of the roller may move when the motor moves a roller shaft. The body of the rollers may move with the roller shaft. The body of the rollers may move independent of the roller shafts.

The one or more roller shafts function to connect the rollers to a frame, a motor, or both. The one or more roller shafts may be fixedly connected to the frame. The one or more roller shafts may function to be move relative to the frame. The one or more roller shafts may extend into a motor to support an end of a roller. The one or more roller shafts may be connected to one or more bearings. The one or more roller shafts may be connected to a frame by one or more bearings. The one or more roller shafts may be connected to the body of the roller by one or more bearings. The one or more roller shafts may move with the roller body (i.e., a fixed roller shaft). The one or more roller shafts may move independent of the body of the roller (i.e., a movable roller shaft). The one or more roller shafts may extend cantilever from a body of a roller. The one or more roller shafts may support the roller on the frame. The roller shaft may support the roller from a motor. The one or more roller shafts may be solid, hollow, have a smooth exterior, or a combination thereof. The one or more roller shafts may have a cross-sectional shape that is circular, triangle, square, oval, pentagon, hexagon, octagon, heptagon, decagon, nonagon, or a combination thereof. The one or more roller shafts may function to allow the roller to rotate. The one or more roller shafts may function to carry a load, apply a load to a frame, or a combination thereof. The one or more roller shafts may extend into a bearing, a motor, or both. The one or more roller shafts may have a smooth exterior. The one or more roller shafts may include one or more recesses.

The one or more recesses may receive one or more transfer devices. The one or more recesses may receive one or more bushings. The one or more recesses may be sufficiently deep so that the one or more transfer devices, bushings, or both are flush with a body when the transfer devices are located within the recesses. The one or more recesses may receive one or more bushings but the one or more bushings may extend above the roller shaft, the motor shaft, or both so that bushings create an interface between the motor shaft and the rotor shaft. The one or more recesses may assist the transfer devices in rotating the rollers. The one more recesses may be located in an end region of the motor shaft, the roller shaft, or both. The one or more recesses may be located proximate to the motor, extend into the motor, or both. The one or more motors may be located on an opposite side of the roller as the motor.

The one or more motors may function to move one or more master rollers. The one or more motors may directly drive the one or more master rollers. The one or more motors may be sufficiently large to drive the master roller and one or more slave rollers, preferably four or more slave rollers, more preferably six or more slave rollers, even more preferably eight or more slave rollers, and most preferably ten or more slave rollers. The motor may be an induction motor. The motor may run from alternating current. The motor may run from direct current (DC). The motor may be a brushed motor. The motor may be a brushless motor. Preferably, the motor is a direct current brushless motor (e.g., brushless DC motor). The motor may include a motor shaft, shaft cover, bushing, motor cover, wires, controller, motor stator, magnets, motor rotor, motor hub, motor windings, or a combination thereof. The motor may be free of contact with a gear box. For example, the motor and master roller may be in direct contact without any intervening gear boxes. The frame may dissipate heat generated by the motor. The motor may be in direct contact with the frame and the frame may be a heat sink for the motor. The motor may be connected to the frame by one or more fasteners.

The one or more fasteners may function to connect the motor, a controller, or both directly to the frame. The one or more fasteners may extend through the motor, the controller, or both into the frame. The one or more fasteners may be a bolt, nut and bolt, screw, or a combination thereof. The one or more fasteners may be one or more fasteners, two or more fasteners, three or more fasteners, or four or more fasteners. The one or more fasteners may extend through or into a motor housing to connect the motor, the controller, or both to the frame. The one or more fasteners may extend into a controller housing. The one or more fasteners may extend through a controller housing and into the motor housing. The one or more fasteners may be sufficiently long to connect the motor housing, controller housing, or both to the frame. The one or more fasteners may extend into a top, bottom, side, face, or a combination thereof, of the motor housing, controller housing, or both. The face may be a surface with a largest area (e.g., a surface of the motor housing that is perpendicular to the axis of rotation). The fasteners may be sufficiently strong so that the motor supports one of the roller shafts. The one or more fasteners may be sufficiently strong to support the motor, one end of a roller shaft, and an article extending across the roller. The roller shaft may be supported by a connection with the motor shaft while the motor is connected to the frame.

The one or more motor shafts may function to rotate the roller shaft. The one or more motor shafts extend from the motor, be located within the motor, or both. The one or more motor shafts may be solid. The one more motor shafts may be hollow. The one or more motor shafts may extend into the roller shaft. The one or more motor shafts may receive the roller shaft. The one or more motor shafts may be connected to a motor rotor, a rotor hub, or both. The one or more motor shafts may provide a force or torque from the motor to the master roller. The motor shaft may extend through the motor so that the roller shaft may be connected to a front side or a rear side of the motor. A hollow motor shaft may extend from a front side to the rear side of the motor so that a shaft can extend all of the way through the motor. The motor shaft may include a shaft cover. The shaft cover may prevent a roller shaft extending through the motor. The shaft cover may plug a hollow motor shaft. The shaft cover may be a rubber plug. The shaft cover may cap a side of the motor. The shaft cover may cover the motor shaft, one or more bushings in the motor, a housing cover, the motor housing, or a combination thereof.

The motor, motor shaft, roller shaft, or a combination thereof may include one or more bushings. The one or more bushings may prevent direct contact between the motor shaft and the roller shaft. The one or more bushings may permit contact between the motor shaft and the roller shaft but may create a flexible barrier between the motor shaft and the roller shaft so that any contact therebetween is dampened. The one or more bushings may be located between the motor shaft and the roller shaft. The one or more bushings may be a ring that extends around a portion of the motor shaft, the roller shaft, or both. The one or more bushings may be cylindrical and extend around all or a portion of the motor shaft, the roller shaft, or both. The one or more bushings may be an O-ring. The one or more bushings may have an open center to receive the motor shaft or the roller shaft. The one or more bushings may extend into a recess in the motor shaft, the roller shaft, or both. The one or more bushings may be free of extension into a recess. The one or more bushings may extend over the recesses. The one or more bushings may fit partially into a recess so that a portion of the bushings are located within the recess and a portion of the bushings are located above the recess. The motor, motor shaft, roller shaft, or a combination thereof may include one or more, two or more, three or more, or even four or more bushings. The bushing may be complementary in shape to the motor shaft, the roller shaft, or both. For example, if the roller shaft as an exterior shape that is a hexagon and the interior of the interior shape is a hexagon then the bushing will have a hexagon shape to fit over the roller shaft and inside of the motor shaft. The one or more bushings may be made of or include a natural material, a synthetic material, rubber, elastomer, polymer, nitrile rubber, vulcanized rubber, polytetrafluoroethylene, or a combination thereof. The one or more bushings may be located inside of the motor cover when the roller shaft and the motor shaft are connected.

The motor cover may cover one or both sides of the motor. The motor cover may function to cover the motor, a controller, or both. The motor cover may seal the motor. The motor cover may seal the motor housing. The motor cover may be part of the motor housing. The motor cover may connect to the motor housing, a frame, or both. The motor cover may receive one or more wires so that the motor, the controller, or both are powered, receive signals, or both.

The one or more wires function to provide power, signal, or both to and/or from the controller, the motor, or both. The wires may connect the motor, the controller, or both to a power source. The wires may connect the motor, the controller, or both to one or more sensors. The one or more wires may have a sufficient gauge to carry power, signals, or both to the motor, the controller, or both, or between the controller and the motor. The motor is connected to at least 2 wires (a positive and a negative). The motor may be connected to a signal wire. The controller may be connected to 2 or more wires and three or more wires. For example, the controller may be connected to a positive, a negative, and a signal wire.

The one or more wires may directly power the controller, the motor, or both. Preferably, the wires are connected to the controller and extend from the controller to the motor.

The one or more controllers function to control the motor, a master roller, a zone, the conveyor system, or a combination thereof. The one or more controllers may be located proximate to the motor. The one or more controllers may be located in a central location. The one or more controllers may be located inside of the motor or the motor housing. The one or more controllers may be connected to the motor housing. The one or more controllers may be connected between the frame and the motor housing, the motor, or both. The one or more controllers may control a motor rotor, a power source, or both. The one or more controllers may be located within a controller housing.

The one or more controller housings may function to house the controller, contact the controller, or both. The one or more controller housings may be part of the motor housing. The one or more controller housings may be a unitary part (e.g., made from the same piece of material) of the motor housing. For example, one piece may be created with a first pocket and a second pocket that are separated by a common wall and the first pocket may be the motor housing and the second pocket may be the controller housing. When a first pocket and a second pocket are separated by a wall the controller housing and controller are external to the motor housing. The one or more controller housings may be a discrete piece and connectable to the motor housing. The one or more controller housings may include a pocket that houses the controller (e.g., an integral pocket). The pocket of the controller housing has a plurality of walls. The controller may be directly connected to a wall of the pocket of the controller housing. The controller, a printed circuit board of the controller, or both may be directly connected to a wall of the controller housing. The controller, the printed circuit board, or both may extend generally parallel to a wall of the pocket and be connected to the wall so that the area (length*width) faces the wall. The pocket of the controller housing may be different than the pocket of the motor housing. The pocket of the controller housing may be a second pocket that is separated from a first pocket in the motor housing. The controller housing, the motor housing, or both may each include one or more internal pockets. The controller housing may have one or more internal pockets (e.g., controller housing internal pockets) that are separate and discrete from the motor housing internal pockets (e.g., motor housing internal pockets). The internal pocket of the controller housing and the motor housing may be located within a same plane. The internal pocket of the controller housing and the internal housing of the motor housing may be located in different planes. The internal pocket of the controller housing may be located within a plane that is generally parallel to a plane of the internal pocket of the motor housing. The planes as discussed herein may be perpendicular to a direction of the axis of rotation of the motor. For example, if the controller housing is located above the motor housing then the controller and motor are located within a same plane (e.g., the axis of rotation extends through a single plane). In another example, if the controller is located in front of the motor then the controller housing and motor housing are located within two planes (e.g., the axis of rotation extends through both planes). The controller housing pocket may be an external pocket when referencing the motor housing (i.e., the controller pocket is located external to the motor housing). For example, the controller housing and the motor housing may share a wall that extends between and separates the controller housing and the motor housing. The conveyor system may be free of a controller housing. The conveyor system may be free of a controller housing, a controller pocket, or both when the controller is located within an internal pocket of the motor housing. The controller housing may be directly connected to the frame. The motor housing may be indirectly connected to the frame via the controller housing. The controller housing may have a geometric shape. The controller housing may be a rhombus. The controller housing may be a square, rectangle, a shape with chamfered corners, one or more flat walls, or a combination thereof. The controller housing may include a through hole. The motor shaft, a roller shaft, or both may extend through the controller housing. The controller housing may be "U" shaped and the motor shaft, the roller shaft, or both may extends through the controller housing. The controller housing may be in two or more pieces and the motor shaft, the roller shaft, or both may extend between the pieces of the controller housing. The controller housing may be free of contact with the motor shaft, the roller shaft, or both. The controller housing may include one or more faster holes. Preferably, the controller housing includes a plurality of fastener holes. The fastener holes may connect the controller housing to a frame, the motor housing, or both. The controller housing may have one set of fastener holes for connecting to the frame and a second set of fastener holes for connecting to the motor housing. Preferably, the fastener holes extend through the controller housing so that one set of fasteners extend from the frame through the controller housing and into the motor housing to connect the frame, motor housing, and controller housing all together. The controller housing, the motor housing, or both may be free of separate mounting ears that extend from the controller housing, the motor housing, or both to form a connection with the frame (e.g., a mounting support that extends outward from the housing). The one or more controllers when located within the controller housing are not located within a motor housing. The one or more controllers may be located outside of the motor stator.

The motor stator may function to move a rotor. The motor stator may include one or more magnets, one or more motor windings, or both. The motor stator may be powered to move the motor rotor. The motor stator may be free of contact with the magnets, the rotor, or both. The motor stator may assist in moving a motor shaft so that the motor rotates a master roller. The motor state may extend around the motor rotor, a plurality of magnets, or both.

The one or more of magnets may function to rotate the rotor when the motor windings are powered. The one or more magnets may be a solid permanent ring magnet. The one or more magnets may be a plurality of magnets. The plurality of magnets may extend around an outside of the motor rotor. The motor may include an even number of magnets. The motor may include an odd number of magnets. The plurality of magnets may be 2 or more, 4 or more, 6 or more, 8 or more, 10, or more, 12 or more, 14 or more, 16 or more, 18 or more, or even 20 or more magnets. The plurality of magnets may be about 50 or less, 40 or less, or 30 or less magnets. The magnets may be made of or include a ferrous metal, neodymium, iron, boron, samarium, cobalt, rare earth metals, Alnico, ceramic, ferrite, manganese, magnetite, iron, nickel, iron oxide, cerium, dysprosium, erbium, europium, gadolinium, holmium, lanthanum, lutetium, praseodymium, promethium, scandium, terbium, thulium, ytterbium, yttrium, or a combination thereof. The one or more magnets may be connected to the motor rotor.

The motor rotor may function to move the motor shaft. The motor rotor may be connected to the motor shaft. The rotor may include an equal number of magnet housings for each magnets. The rotor may be rotated by the magnets when the motor windings are powered. The rotor may include a rotor hub that is directly connected to the motor shaft.

The rotor hub may be connected to the motor shaft and may rotate upon activation of the motor windings. The rotor hub may be surrounded by the motor stator, the motor windings, or both. The rotor hub may have a hollow motor shaft that is a through hole through the rotor hub. The rotor hub may house a solid motor shaft. The rotor hub may be rotated when the motor windings are activated.

The one or more motor windings function to rotate the rotor when the motor windings are powered. The one or more motor windings may move the magnets when the motor windings are powered. The motor may include a plurality of motor windings. The motor windings may be complementary to the magnets. The motor may include one or more motor windings than magnets. The motor may include an odd number of motor windings. The motor may include 2 or more, 4 or more, 6 or more, 8 or more, 10, or more, 12 or more, 14 or more, 16 or more, 18 or more, or even 20 or more motor windings. The plurality of motor windings may be about 50 or less, 40 or less, or 30 or less motor windings. Preferably, the motor includes 21 motor windings that are located proximate to 20 motors. The motor windings may be located inward of the magnets (i.e., the magnets may extend around the motor windings). The motor windings may extend around the magnets (e.g., outside). The motor windings may be located within the motor housing.

The motor housing functions to protect the rotor, stator, controller, or a combination thereof. The motor housing functions to connect the motor to the frame, the roller shaft, or both. The motor housing may be a geometric shape. The motor housing may be round, square, square without corners, rectangular, have one or more flat walls, or a combination thereof. A wall of the motor housing may extend substantially parallel to a wall of the frame, the controller housing, or both that is connected to the motor housing. The motor housing may have an empty center (e.g., an internal pocket or a motor pocket) that receives the motor, the motor rotor, the motor stator, or a combination thereof. The motor housing may include one or more internal pockets. Preferably, the motor housing includes at least a motor pocket. The motor housing may include a single pocket and the one or more motors and the one or more controllers may be located within the single pocket. The single pocket may house a single motor and one or more controllers. Preferably, the single pocket houses one controller and one motor. The motor and the controller may be located within a single plane within the motor pocket. The motor and the controller may be located within two different planes within the motor pocket. The motor may be located within a central part of the single pocket and the controller may be located outside of the central part, around the motor, or both. The motor housing may include two internal pockets. One internal pocket may house the motor and a second internal pocket may house a controller. The one or more motor housings may include a pocket in a corner (i.e., internal pocket or controller pocket), a location outside of a primary pocket (e.g., a pocket that receives the motor (i.e., motor pocket)), or both. The pockets of the motor housing may be in any corner of the motor housing. The pockets may be connected to a motor pocket. The pocket may be separated from the motor pocket. The pocket may be square, round, rectangular, oval, triangular, or a combination thereof. The motor housing may include one or more through holes or cavities that receive one or more fasteners that connect the motor housing to the frame. The motor housing may include primary fastener holes and alternative fastener holes. The motor housing may include sets of holes that allow the motor housing to be face mounted, top mounted, or both. The motor housing may be connected to the frame on a drive side, a ride side, or both of the frame.

The drive side may be the side of the conveyor system where the motor is connected. The ride side may be an opposite side of the conveyor system as the motor. The ride side may be free of a motor. The drive side may include one or more through holes in the frame that the roller shaft extends through to connect to the motor. The ride side may have the roller shaft connected to the fame. The ride side may have a bearing that connects the roller shaft to the frame. The ride side may have a roller shaft that rolls. The ride side may have a roller shaft that is static. The drive side has a roller shaft that moves.

The one or more bearings may function to support the motor shaft as the motor shaft is rotated. The one or more bearings may axially support the motor shaft and the roller shaft, once the roller shaft is located within the motor shaft. The one or more bearings may connect the motor shaft to the frame. The one or more bearings may be connected to the frame on the ride side. The one or more bearings may be free of contact with the frame on the drive side. The one or more bearings may allow the rollers to rotate about an axis. The one or more bearings may be located within a body of the roller. The one or more bearings may extend between the body of the roller and the roller shaft. The one or more bearings may be a flange bearing. The bearing may be located within a housing that includes one or more flanges. The one or more flanges may function to connect the bearing to the frame. The one or more flanges may support the bearing on the frame but allow for some movement of the bearing relative to the frame, the flanges, or both. The one or more flanges of the flange bearing may receive one or more fasteners for connecting the bearing to the frame. The one or more bearings may be flexible. The one or more bearings may be flexible so that the roller shaft may not be perpendicular to the frame on the drive side and/or the ride side. The one or more bearings may include a flexible sleeve that permits movement of the roller shaft.

The one or more flexible sleeves may function to permit movement of the bearing, the roller shaft, or both relative to each other. The one or more flexible sleeves may be a plurality of flexible sleeves. The one or more flexible sleeves may be located between the bearing and the roller shaft. The one or more flexible sleeves may be located between an outer ring of the bearing and the bearing housing. The one or more flexible sleeves may be located between the outer ring of the bearing and the body of the roller. The one or more flexible sleeves may permit the roller shaft to move about 1 degree or more, about 2 degrees or more, about 5 degrees or more. The one or more flexible sleeves may permit the roller shaft to extend between the frames when the connection points (e.g., bearing, hole in frame, motor shaft) are not collinear. The flexible sleeve may assist in centering the roller shaft when the drive side and the ride side are not parallel to each other, when the center of the bearings and a central axis of the roller shaft are not collinear, when the center of the bearings and a central axis of the roller shaft are not concentric. The flexible sleeves may allow a center of the bearing to move without affecting the ability of the bearing to rotate. The bearing may be a spherical plain bearing. The bearing may have a ball and socket arrangement so that an inner race can move relative to an outer race. The bearing may permit angular rotation about a central axis point in one or more orthogonal directions or two or more orthogonal directions. The flexible sleeve may be made of or include metal, rubber, fiber, a natural material, a synthetic material, plastic, a polymer, poly vinyl chloride, urethane, neoprene, nylon, nitrile, polyester, leather. or a combination thereof. The one or more flexible sleeves may function to rotate in an upstream direction (e.g., in the forward direction) or a downstream direction (e.g., in the rearward direction). The one or more flexible sleeves may be used with or in lieu of a frame with adjustable portions.

The adjustable portions may function to permit movement of a roller shaft, the motor shaft, bearings, or a combination thereof so that the rollers may be adjusted to be substantially parallel with both side of the frame. The adjustable portions may be a through hole in the frame that permits movement of the motor shaft, the bearings, or both along the machine direction. The adjustable portions may be an oblong hole in the frame. The adjustable portions may allow the bearings to slide along the frame when the fasteners are loosened. The adjustable portions may be oval.

FIG. 1 illustrates a conveyor system 2 including a plurality of rollers 8 located between two frame members 14. The rollers 8 include master rollers 10 directly connected to a motor 30 and slave rollers 12 that are driven by the master rollers 10. The conveyor system 2 includes a plurality of zones 4 with a mater roller 10 in the center of each zone 4 so that slave rollers 12 are located on each side of the mater rollers 10. The master rollers 10 move the slave rollers 12 in the direction 80 via one or more belts 16.

Figure 2A:
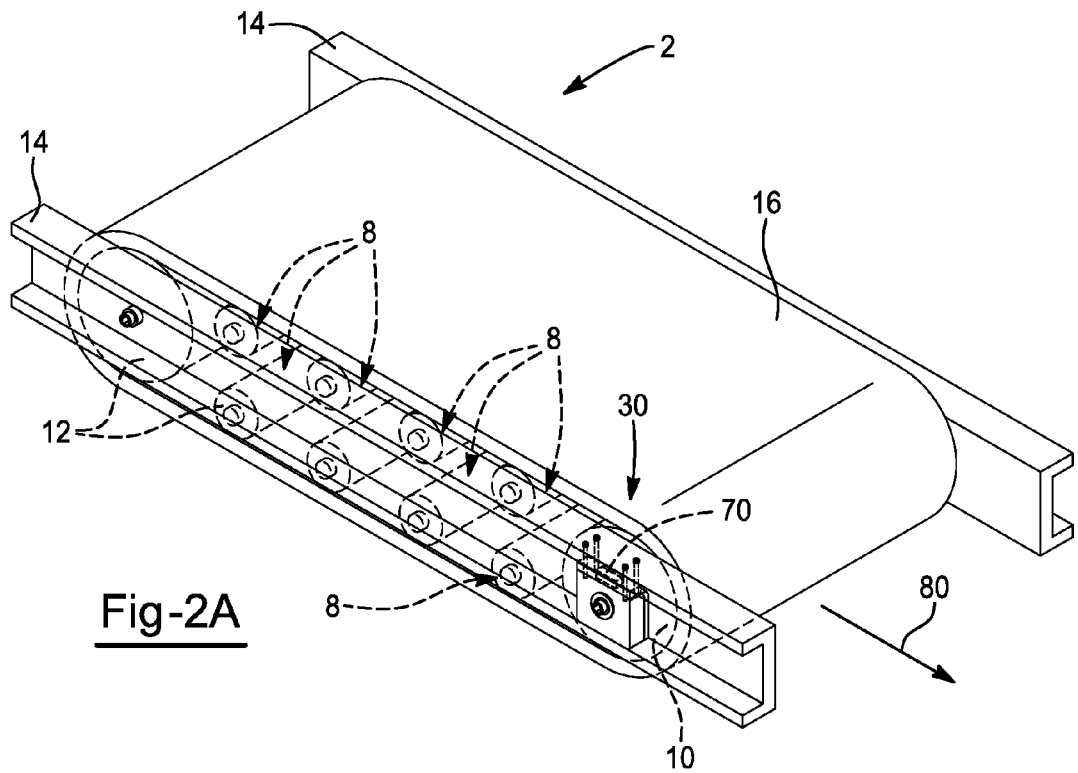
FIG. 2A is a top perspective view of a conveyor system including rollers within a belt conveyor.

FIG. 2A illustrates a conveyor system 2 with a plurality of rollers 8. The plurality of rollers 8 include a master roller 10 and slave rollers 12 that support a belt 16 that wraps all of the rollers 8. The master roller 10 is directly connected to the motor 30 so that the motor directly drives the master roller 10 and the master roller 10 drives the slave rollers 12 in the direction 80 via the belt 16. The motor 30 and controller 70 are directly connected to the frame 14.

Figure 2B:
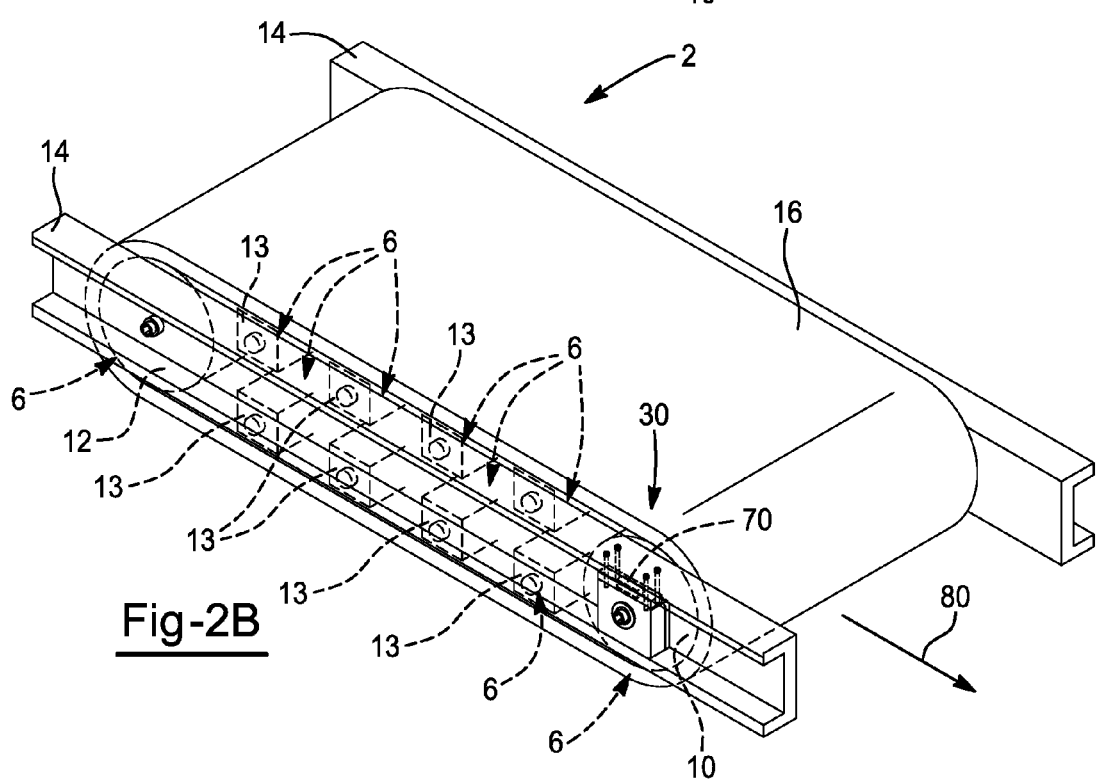
FIG. 2B is a top perspective view of a conveyor system including support devices within a belt conveyor

FIG. 2B illustrates a conveyor system 2 with a plurality of support devices 6. The plurality of support devices 6 include a master roller 10 and slave rollers 12, some of which are supports 13, that support a belt 16 that wraps all of the rollers 8. The master roller 10 is directly connected to the motor 30 so that the motor directly drives the master roller 10 and the master roller 10 drives the slave rollers 12 in the direction 80 via the belt 16. The motor 30 and controller 70 are directly connected to the frame 14.

Figure 3:
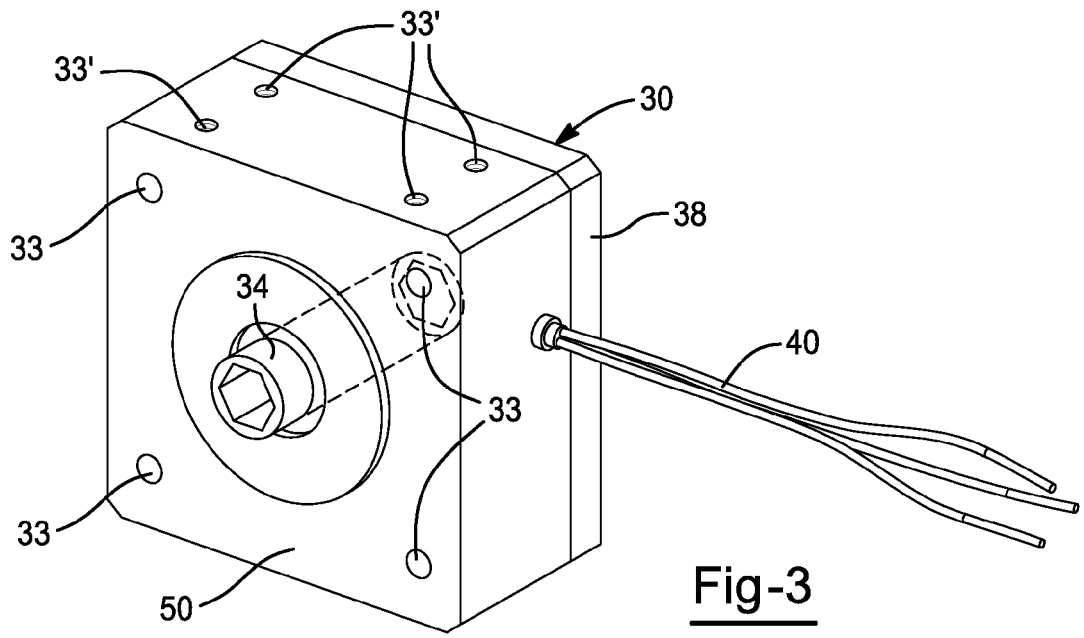
FIG. 3 is close-up view of a motor.

FIG. 3 illustrates the motor 30 having a motor shaft 34. The motor 30 includes a plurality of wires 40 that power the motor 30. The motor housing 50 includes a plurality of fastener holes 33 and alternative fastener holes 33' that allow the motor 30 to be connected top down or a face of the motor 30 to be connected to the frame (not shown). 14

Figure 4:
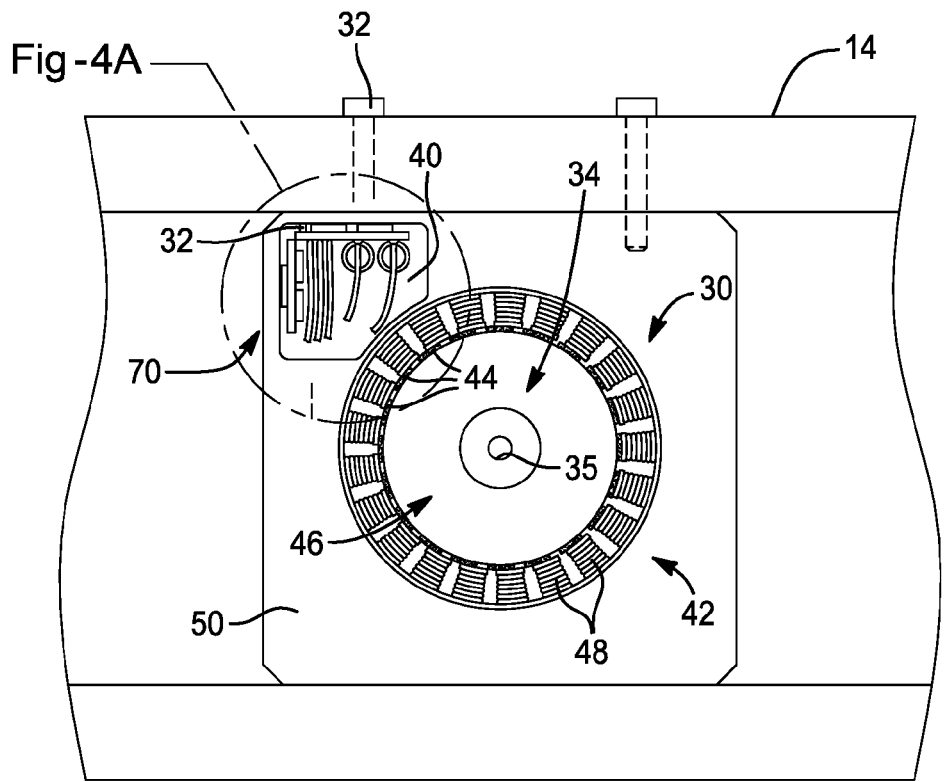
FIG. 4 is a close-up view of a motor and controller suspended from the frame.

FIG. 4 illustrates a cross-section of the motor 30 and the frame 14 cut along line IV-IV of FIG. 1. The motor 30 has the motor cover removed and the motor 30 is connected to the frame 14 in a top down manner by fasteners 32. The motor housing 50 has an internal location that houses both the motor 30 and a controller 70 that is connected to a wall of the motor housing 50 in contact with the frame 14. The motor 30 includes a stator 42 including a plurality of windings 48 and a rotor 46 including a plurality of magnets 44. A plurality of wires 40 provide power to the windings 48 to drive the rotor 46 and the motor shaft 34 connected to the rotor 46.

Figure 4A:
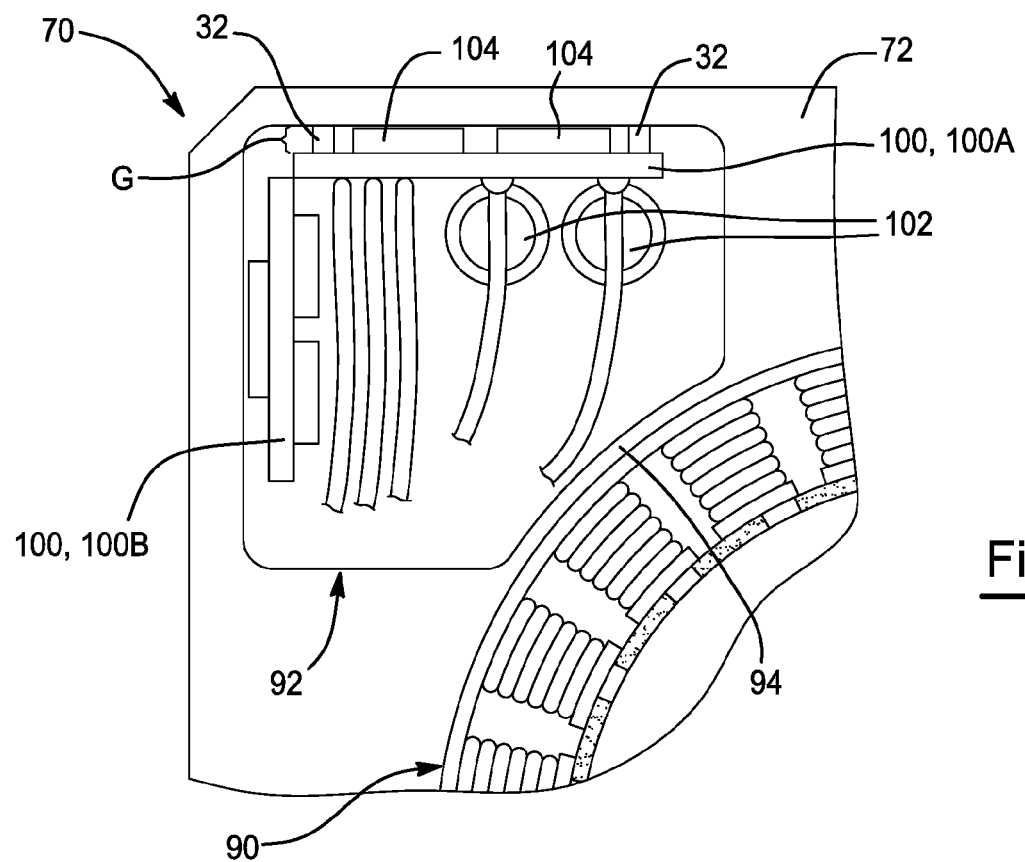
FIG. 4A is a close-up view of the controller within a pocket.

FIG. 4A is a close up view of the controller 70 of FIG. 4. The controller 70 is located in the second pocket 92 that is adjacent to the first pocket 90 and separated by a separating wall 94. The controller 70 includes printed circuit board 100 that mirror the shape of the controller housing 72. The controller includes a first printed circuit board 100A that is connected to the controller housing 72 by fasteners 32, and a second printed circuit board 100B that are free of connection from the controller housing 72 but is connected to the first printed circuit board 100A. The first printed circuit board 100A includes capacitors 102 on a first side facing away from the controller housing 72 and power switching devices 104. The power switching devices 104 produce heat that is transferred to the controller housing 72 so that the controller 70 remains cool. The fasteners 32 are sufficiently short so that a gap (G) is located between the first printed circuit board 100A that is equal to the height of the power switching devices 104 so that the power switching devices 104 extend between the first printed circuit board 100A and directly contact the controller housing 72. The second printed circuit board 100B includes circuitry that produce less heat than the power switching devices 104.

Figure 4B:
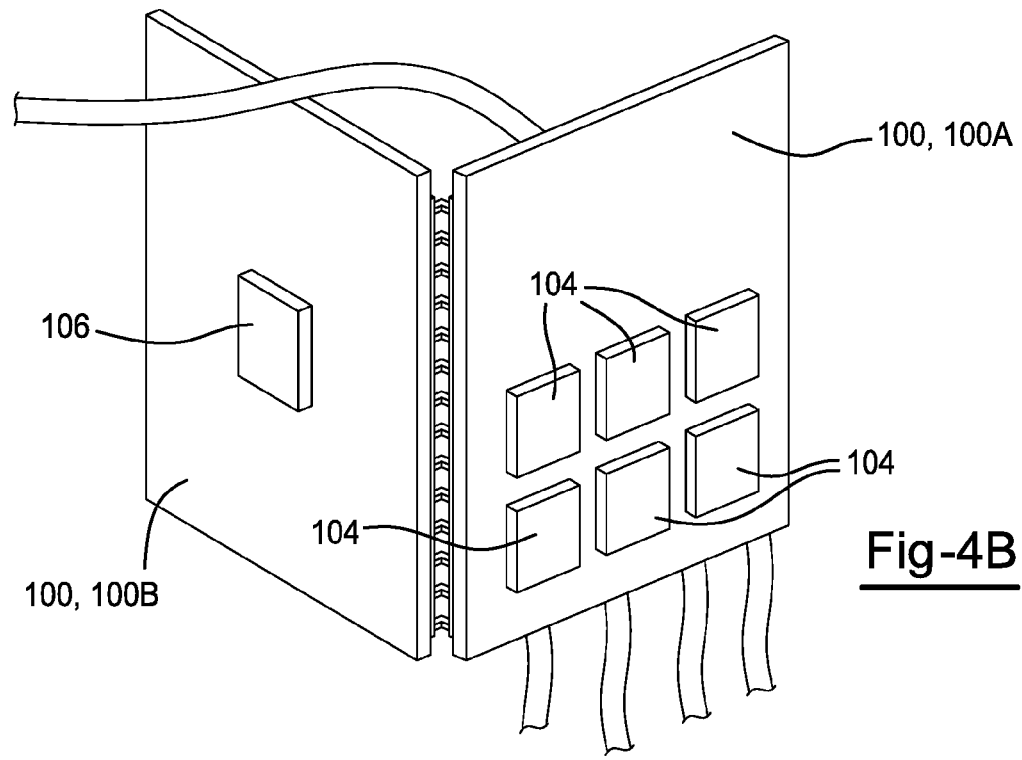
FIG. 4B is a close-up view of the controller and circuitry of FIG. 4A.

FIG. 4B is a rear surface of the printed circuit boards 100. The first printed circuit board 100A includes a plurality of power switching devices 104 and the second printed circuit board 100B includes a microprocessor 106 and other circuitry.

Figure 5:
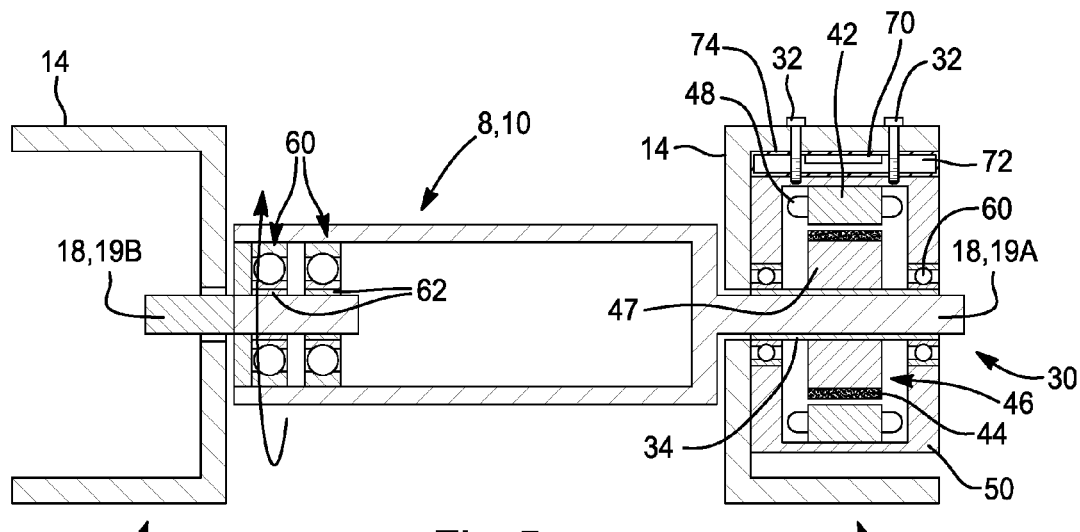
FIG. 5 is a cross-sectional view of motor and controller in communication with and roller and frame.

FIG. 5 illustrates a cross-sectional view of a roller 8, motor housing 50, and controller housing 72 connected to a frame 14 all of which may not be on the same plane. The motor 30 is located on the drive side 52 of the roller 8. The motor housing 50 and controller housing 72 are directly connected to the frame 14 by fasteners 32 and the controller 70 is located between the frame 14 and motor 30. A top 74 of the controller housing 72 is in contact with the frame 14. The controller housing 72 is separate from and connected to the motor housing 50. The controller 70 is located within the controller housing 72 and is mounted to a wall closest to the frame 14. The motor 30 extends over a roller shaft 18, which is a fixed roller shaft 19A that moves with the roller 8. The ride side 54 (or non-driven side) of the roller 8 includes a roller shaft 18 that is a movable roller shaft 19B relative to the body of the roller 8. The movable roller shaft 19B extends through and is connected to the frame 14 and a pair of bearing 60 are located within the roller 8 and connected to the movable roller shaft 19B so that the roller shaft 18 remains static and the roller 8 rotates above the movable roller shaft 19B. The bearings 60 includes a flexible sleeve 62 extending between the roller shaft 18 (however, the flexible sleeve may be located between the bearing and the roller 8) and the bearing 60 that permits the bearing 60 and shaft 18 to mover relative to each other in the event that the bearing 60 on the drive side 52 and the bearing 60 on the ride side 54 are not concentric (e.g., the center of the bearings and the central axis of the roller do not form a collinear line having a substantially right angle with the frame on the ride side and the frame on the drive side). The motor 30 includes a motor housing 50 that connects the motor 30 to a controller housing 72 so that the motor 30 and controller housing 72 are suspended from the frame 14. A motor shaft 34 extends through a center of the motor 30 and is exposed on both ends through the motor housing 50. A bearing 60 is connected at each end of the motor shaft 34 and to the motor housing 50. The motor shaft 34 is connected to a rotor 46 via a motor hub 47 that includes a one or more magnets 44 (e.g., permanent magnets). The magnets 44 are located across from the stator 42 that includes one or more windings 48 and preferably a plurality of windings 48.

Figure 6:
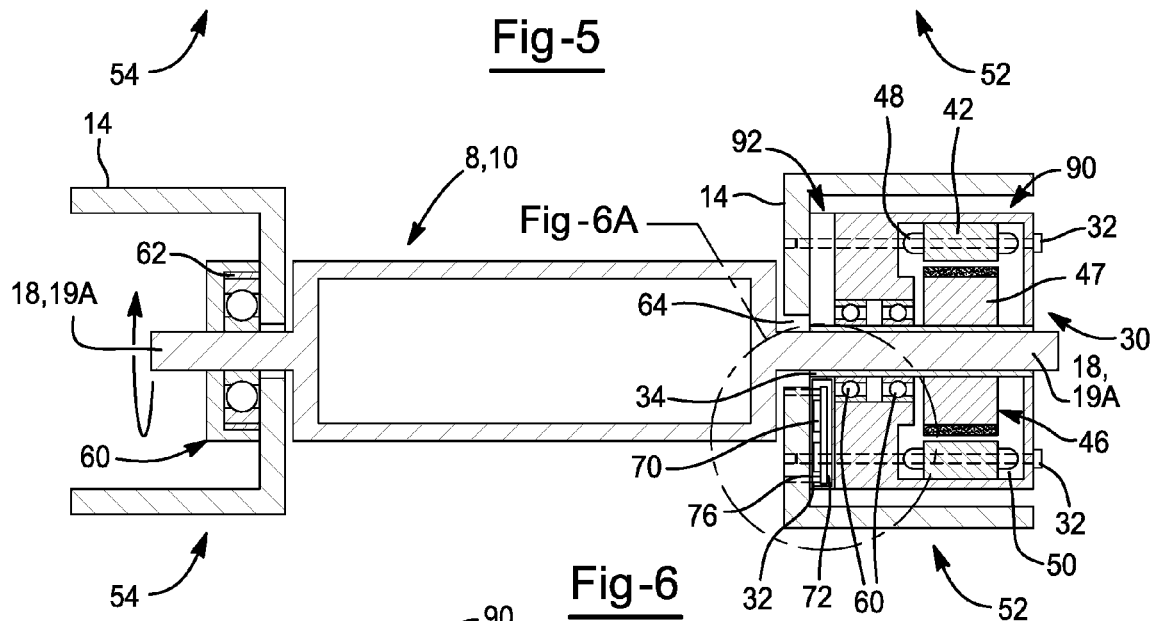
FIG. 6 is a cross-sectional view of a motor, controller, and roller with the motor supporting an end of the roller.

FIG. 6 illustrates a cross-sectional view of a roller 8, motor housing 50 and controller housing 72 connected to a frame 14 all of which may not be on the same plane. A face 76 of the controller housing 72 is connected to the frame 14. The motor 30 is located on the drive side 52 of the roller 8. The motor housing 50 and controller housing 72 are connected to the frame 14 by fasteners 32 that extend through the controller housing 72 and frame 14 into the motor housing 50. The controller 70 is sandwiched between the frame 14 and the motor 30. The motor housing 50 includes a motor 30 and the controller housing 72 includes a controller 70. The motor housing 50 and the controller housing 72 are one piece that includes two separate pockets for receiving the motor components in pocket one 90 and the controller components in pocket two 92. The motor 30 extends over a roller shaft 18 that is located within the same plane. The roller shaft 18 that the motor 30 extends over is a fixed roller shaft 19A that moves with the roller 8. The ride side 54 (or non-driven side) of the roller 8 includes a roller shaft 18 that is a fixed roller shaft 19A relative to a body of the roller but moves relative to the frame 14. The roller shaft 18 extends through the frame 14 and into a bearing 60 that connects the roller shaft 19 to the frame 14 so that the roller shaft 18 and the roller 8 can move together. The bearing 60 includes a flexible sleeve 62 extending between the roller shaft 18 and the bearing 60 that permits the bearing 60 and shaft 18 to move relative to each other in the event that the bearing 60 on the drive side 52 and the bearing 60 on the ride side 54 are not concentric (e.g., the center of the bearings and the central axis of the roller do not form a collinear line). The motor 30 includes a motor housing 50 that connects the motor 30 to the frame 14. A motor shaft 34 extends through a center of the motor 30 and is exposed on one end through the motor housing 50. A pair of bearing 60 is connected at one end of the motor shaft 34 and to the motor housing 50. The motor shaft 34 is connected to a rotor 46 via a motor hub 47 that includes a one or more magnets 44 (e.g., permanent magnets). The magnets 44 are located across from the stator 42 that includes one or more windings 48 and preferably a plurality of windings 48.

Figure 6A:
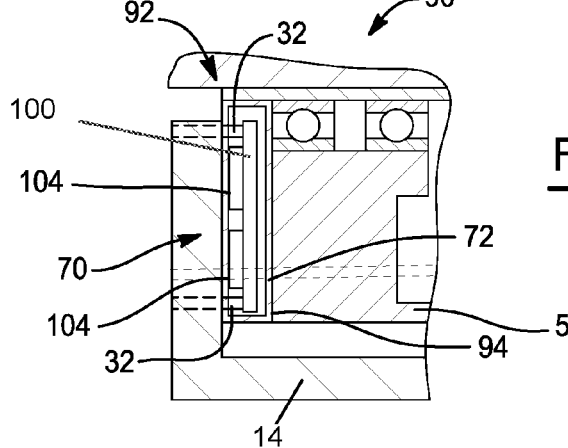
FIG. 6A is a close-up view of the controller and circuitry of FIG. 6.

FIG. 6A is a close-up view of the motor housing 50 connected to the controller housing 72, and the controller housing 72 connected to the frame 14 via a fastener that is shown as dotted line. The motor housing 50 includes a first pocket 90 and the controller housing 72 includes a second pocket 92, and the motor housing 50 and the controller housing 72 are separated by a separating wall 94. The second pocket 92 includes a controller 70 that is connected to the controller housing 72 by fasteners 32. The controller 70 includes a printed circuit board 100 with power switching devices 104 that are in contact with a wall of the controller housing 72 that is in direct contact with the frame 14 so that the frame acts as a heat sink.

Figure 7:
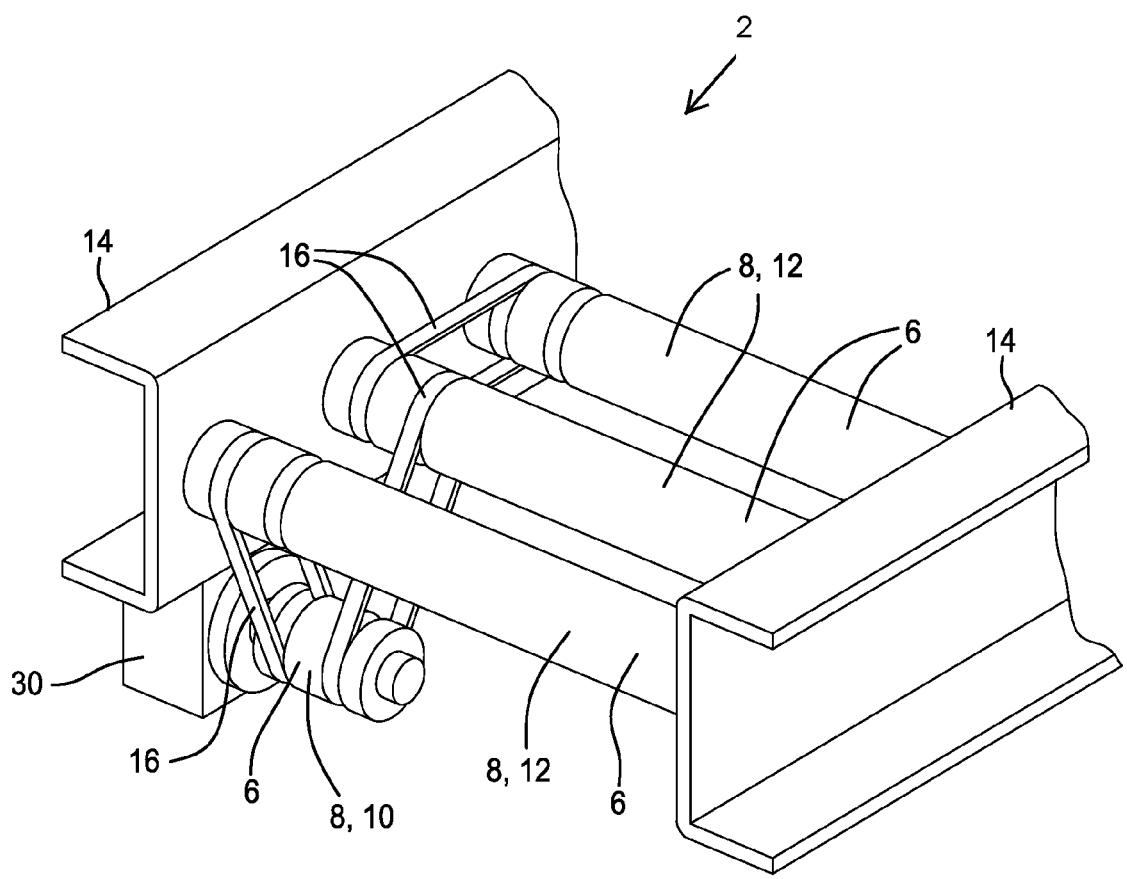
FIG. 7 is perspective view of a motor and conveyor system.

FIG. 7 illustrates a portion of a conveyor system 2 including a plurality of support devices 6 connected to a motor 30 and controller (not shown) that extend from a bottom of the frame 14 in a plane below the slave rollers 12. The controller is located between the frame 14 and the motor 30 and is obscured by the frame 14. The motor 30 supports a master roller 10 (e.g., shown as a pulley) cantilever so that the master roller 10 drives the slave rollers 12 via transfer devices 16 that rotate all of the rollers 8 together.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Conveyor system
2A Roller conveyor
2B Belt conveyor
4 Zone
6 Support device
8 rollers
10 Master Roller
12 Slave Roller
13 Support
14 Frame 16 transfer device
16A Flexible coupling
16B Conveyor belt
18 Roller shaft
19A Fixed roller shaft
19B Movable roller shaft
20 Recesses
30 Motor
32 Fastener
33 Fastener holes
34 Motor Shaft
35 Shaft cover
36 bushing
38 Motor cover
40 wires
42 Motor stator
44 Magnets
46 Motor Rotor
47 Rotor hub
48 Motor windings
50 motor housing
52 Drive side
54 Ride side
60 Bearing
62 Flexible sleeve
70 Controller
72 Controller housing
74 top
76 face
80 Direction of movement
90 Pocket one
92 Pocket two
94 Separating wall
100 Printed Circuit board
100A Connected PCB
100B Unconnected PCB
102 Capacitor
104 Power switching device
106 Microprocessor
G Gap

I claim:

1. A conveyor system comprising:
a. one or more frames;
b. one or more controllers;
c. one or more motors located within a motor housing; and
d. a plurality of support devices;
wherein the motor housing includes one or more internal pockets that receive the one or more motors and the one or more controllers, and the one or more controllers are in contact with one or more walls of the motor housing; and
wherein the motor housing is directly connected to the one or more frames so that at least one of the one or more walls in contact with the one or more controllers is in direct contact with the one or more frames.

2. The conveyor system of claim 1, wherein the one or more internal pockets are a single internal pocket and the one or more motors and the one or more controllers are located within the single pocket together.

3. The conveyor system of claim 2, wherein the one or more motors and the one or more controllers are located within a same plane within the single pocket.

4. The conveyor system of claim 1, wherein the motor housing is substantially a rhombus shape and the one or more motors are located within a central part of the one or more pockets and the one or more controllers are located outside of the central part around the one or more motors.

5. The conveyor system of claim 1, wherein the one or more motors are a brushless direct current motor.

6. The conveyor system of claim 1, wherein each of the plurality of support devices is a roller that includes a roller shaft and the plurality of support devices includes one or more master rollers and one or more slave rollers;
wherein the conveyor system has a plurality of zones and each of the plurality of zones includes at least one of the one or more master rollers and at least one of the one or more slave rollers; and
wherein the one or more motors include a motor shaft and the motor shaft of the one or more motors is in direct communication with the roller shaft of the one or more master rollers.

7. The conveyor system of claim 6, wherein the at least one of the one or more master rollers is located in each of the plurality of zones and is located between two or more of the one or more slave rollers.

8. The conveyor system of claim 1, wherein the motor housing includes a controller housing and the controller housing includes one or more internal pockets that receive the one or more controllers.

9. The conveyor system of claim 8, wherein the one or more internal pockets of the motor housing is a single motor pocket that includes one of the one or more motors; the one or more internal pockets of the controller housing is a single controller pocket that includes the one or more controllers; and the motor pocket and the controller pocket are separated by a wall that joins the controller housing and the motor housing together.

10. A conveyor system comprising:
a. one or more frames;
b. one or more controllers located within a controller housing;
c. one or more motors located within a motor housing; and
d. a plurality of support devices;
wherein the motor housing includes one or more internal pockets that receive the one or more motors and the controller housing includes one or more internal pockets that receive the one or more controllers, and the one or more controllers are in contact with one or more walls of the controller housing; and
wherein the controller housing is directly connected to the one or more frames so that at least one of the one or more walls in contact with the one or more controllers are in direct contact with the one or more frames and the motor housing is connected to the controller housing.

11. The conveyor system of claim 10, wherein the one or more motors and the one or more controllers are located within a same plane.

12. The conveyor system of claim 10, wherein the one or more motors and the one or more controllers are located within two separate planes that are generally parallel to each other.

13. The conveyor system of claim 10, wherein the motor housing and the controller housing when connected together are substantially a rhombus shape.

14. The conveyor system of claim 10, wherein a top of the controller housing is connected to the one or more frames and the controller housing hangs from the one or more frames, or a front face of the controller housing is connected to the one or more frames and a rear face of the controller housing is connected to the motor housing.

15. The conveyor system of claim 10, wherein one or more of the plurality of support devices are one or more slave rollers, one or more supports, or both located within a first plane, and one or more of the plurality of support devices are one or more master rollers located in a second plane that is below the first plane.

16. The conveyor system of claim 15, wherein the one or more master rollers are connected to the one or more slave rollers by one or more torque transfer devices so that movement of the one or more master rollers moves the one or more slave rollers.

17. The conveyor system of claim 10, wherein a body of the controller housing and the motor housing form a connection.

18. The conveyor system of claim 10, wherein the one or more motors are a brushless direct current motor.

19. The conveyor system of claim 10, wherein each of the plurality of support devices is a roller that includes a roller shaft and the plurality of support devices includes one or more master rollers and one or more slave rollers;
    wherein the conveyor system has a plurality of zones and each of the plurality of zones includes at least one of the one or more master rollers and at least one of the one or more slave rollers; and
    wherein the one or more motors include a motor shaft and the motor shaft of the one or more motors is in direct communication with the roller shaft of the one or more master rollers.

20. A motor comprising:
a. a motor housing including:
   i. a first pocket including one or more motors; and
b. a second pocket including one or more controllers directly connected to one or more walls of the second pocket, the one or more controllers having a printed circuit board with a shape that mirrors a shape of the second pocket;
wherein:
   1) the first pocket and the second pocket are both located within the motor housing;
   2) the first pocket is located within the motor housing and the second pocket is located within a controller housing that is connected to the motor housing and the motor housing and the controller housing are formed in one integral piece; or
   3) the first pocket is located within the motor housing and the second pocket is located within a controller housing that is connected to the motor housing, and the controller housing is separable from the motor housing.

\* \* \* \* \*